April 29, 1924.
L. H. JACOBS
AIRCRAFT PROPULSION AND CONTROL
Filed June 18, 1923　　2 Sheets-Sheet 1
1,491,954
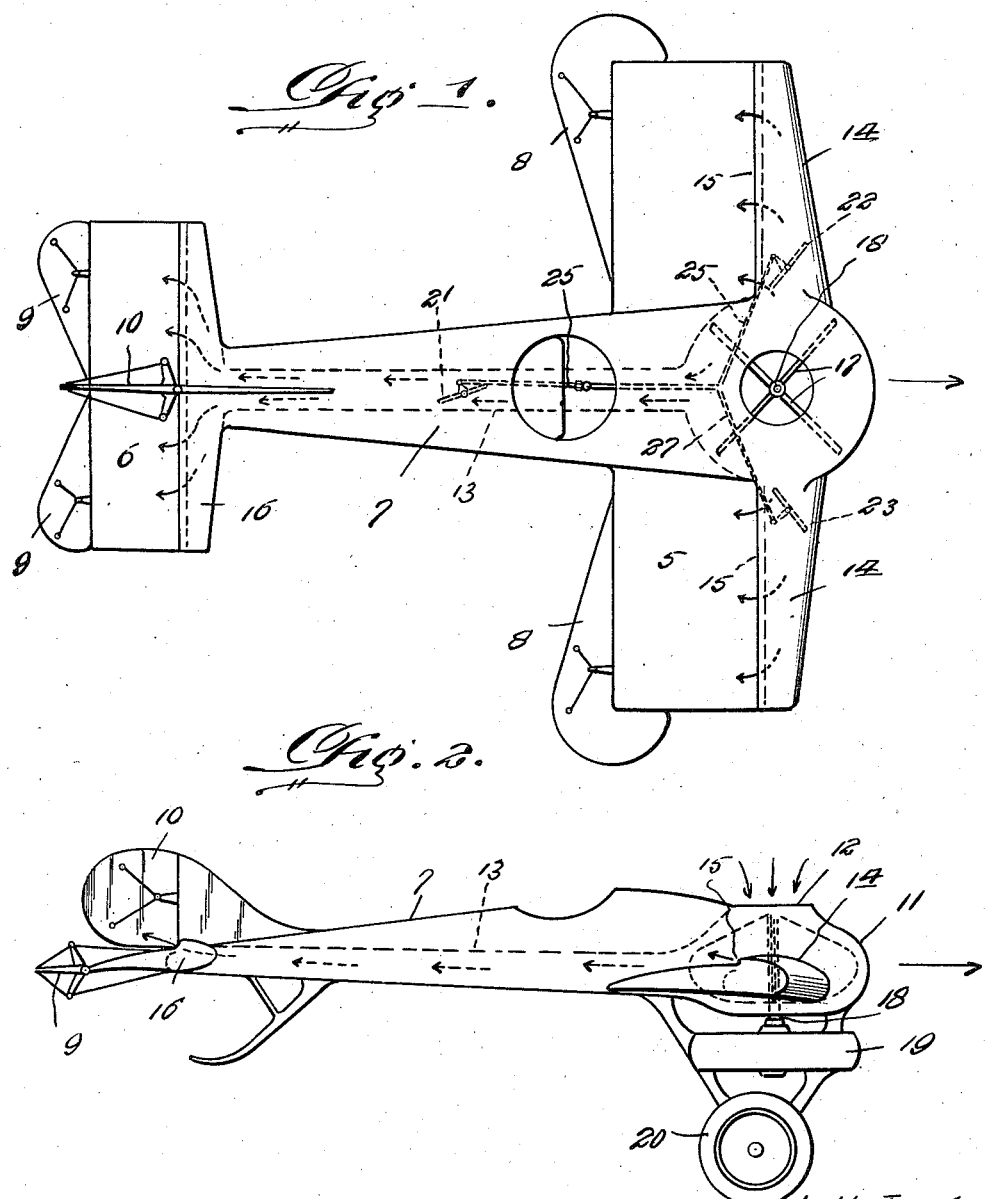

April 29, 1924.
L. H. JACOBS
1,491,954
AIRCRAFT PROPULSION AND CONTROL
Filed June 18, 1923  2 Sheets—Sheet 2
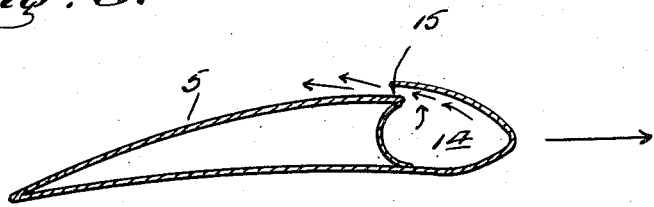
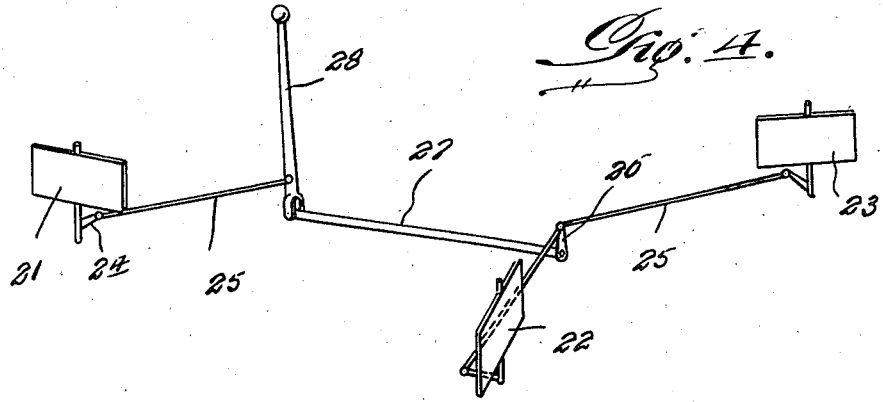
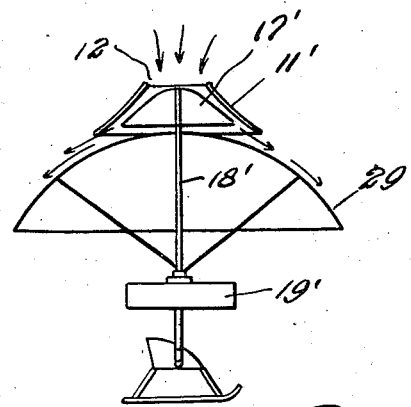
L. H. Jacobs,
Inventor Patented Apr. 29, 1924.

1,491,954

UNITED STATES PATENT OFFICE.

LEON H. JACOBS, OF MANSFIELD, LOUISIANA.

AIRCRAFT PROPULSION AND CONTROL.

Application filed June 18, 1923. Serial No. 645,946.

*To all whom it may concern:*

Be it known that I, LEON H. JACOBS, a citizen of the United States, residing at Mansfield, in the parish of De Soto and State of Louisiana, have invented certain new and useful Improvements in Aircraft Propulsion and Control, of which the following is a specification.

This invention relates to certain new and useful improvements in means for controlling and propelling aircraft by means of which the machine may be effectively and readily caused to ascend or descend or change its direction of travel.

The primary object of the invention is to provide means for the lift and propulsion of aircraft operating without the use of propellers in the usual manner, and by means of which the long sought feature of being able to "hover," may be accomplished.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a top plan view of an airplane constructed in accordance with the present invention.

Figure 2—is a side elevational view of the device shown in Figure 1.

Figure 3—is a cross sectional view of one of the wings.

Figure 4—is a diagrammatic perspective view of the controlling valves, and their operating connections, and Figure 5—is a diagrammatic view illustrating the principle of the invention applied to a simple use of the same.

Referring more in detail to the drawings, and particularly to Figures 1 to 4 inclusive, the invention is shown as applied to an airplane, provided with main and tail wings, respectively, indicated by the reference numerals 5 and 6, which wings extend from opposite sides of the body or fuselage 7. The main wings may be provided with the usual controls such as the ailerons 8 or the like, and the horizontal rudders 9 may be carried at the rear edges of the tail wings 6, while the vertical rudder 10 may be suitably mounted above the central portion of the tail wings as shown in Figures 1 and 2.

In this embodiment of the invention, the forward end of the body or fuselage 7 is constructed to provide a relatively large blower casing 11, having a top inlet opening 12 and a rearwardly opening discharge bolt which connects with the forward end of a central longitudinal tube or passage 13, provided in the body or fuselage. The fan casing 11 is also provided with side outlets, which communicate with the inner ends of hollow compartments 14, which are formed in the forward edges of the main wings 5. These compartments are provided with rear discharge openings 15 located directly above the upper upwardly curved surfaces of the wings as shown in Figure 3. The discharge port 15 of each wing may consist of a single slot extending from end to end of the wing or a longitudinal series of perforations may be provided. The tail wings 6 are provided with hollow forward compartments as at 16, similar in construction to the compartments 14, and having a similar discharge opening disposed above the upper surfaces of the tail wings. The forward compartments 16 of the tail wings communicate with the rear end of the tube or passage 13.

The fan casing 11 has a rotary bladed fan element 17, disposed therein and mounted upon a vertical shaft 18, which is operatively connected to a suitable motor diagrammatically illustrated at 19, directly beneath the fan casing. The usual landing gear 20 may also be provided.

It will be seen that when the motor 19 is placed into operation, the fan element 17 will be rotated, so as to draw a large volume of air into the inlet 12 and discharge the same into the compartments 14 and 16 from which it will be delivered from the discharge slots or openings 15 at a high rate of speed across the curved upper surfaces of the wings. This will cause a partial vacuum or reduced pressure above the wings, so that the pressure beneath the wings will lift the airplane while the rearward flow of the air will provide for the necessary forward propulsion. The lifting force is assisted by the suction at the forward end of the machine into the inlet opening 12. The usual balancing controls and vertical and horizontal rudders would be necessary only after the motor failed, but they become a part and work with the novel control shown in Figures 1 and 4. This control embodies butterfly valves 21, 22 and 23, respectively located in the passage 13, the passage 14 of the right hand main wing, and the passage 14 of the left hand main wing for controlling the flow of air into the passages 14 and 16. The valves 21, 22 and 23 are mounted upon vertical pivots, and have horizontal crank arms 24, which are connected to links 25, the links 25 of the valves 22 and 23 being in turn connected to a crank arm 26 on one end of a rock shaft 27, to the other end of which is pivoted the usual control lever 28 having the link 25 of the valve 21 pivoted thereto. By rocking the lever 28 in one direction, the valve 22 is opened simultaneously with a similar closing movement of the valve 23 and viceversa. By swinging the lever 28 in another direction, the valve 21 may be opened or closed to the desired degree. In this manner, the relative quantity of air passing into the chambers or passages 14 and 16 may be changed, so that the lift on each plane or wing may be varied. This makes possible the long sought feature to "hover" or maintain a balance while not moving.

As the vertical rudder 10 is disposed in the path of the blast of air from the tail wings, the machine may be turned on an even keel without moving forwardly or leaving a given point.

As shown in Figure 5, the principle of the invention can be used to advantage by mounting the blower in the center of an umbrella shaped wing 29, in which case, the blower casing is denoted by the numeral 11', and 17' indicates the rotatable blower element. In this figure, the blower is mounted above the wing 29, and is provided with a top inlet opening 12, while the bottom of the casing has an opening and a flared form, so that an annular blast of air will be discharged across the curved surface of the wing. The motor 19' is disposed beneath the wing 29, and drives the blower shaft 18'. This construction would function similar to parachute if the motor failed.

From the foregoing description, it is believed that the construction and operation as well as the advantages of the present invention will be readily understood and appreciated by those skilled in the art.

Minor changes may be made therein, without departing from the spirt and scope of the invention as claimed.

Having thus described my invention, what I claim as new, and desire to secure by Letters-Patent, is:

1. The combination with an airplane of a fan casing arranged upon the upper surface of one of the wings and having a central opening, oppositely extending air-passageways extending from the casing at diametrically opposite points and having longitudinal openings arranged adjacent the forward edges of the wings, said passage ways being a continuation of the cross-sectional contour of the wings, a fan in the casing, and a longitudinal passage way extending through the fuselage of the airplane, and a passageway extending transversely across the tail of the airplane and having a rearwardly disposed discharge opening.

2. The combination with an airplane of a fan casing arranged upon the upper surface of one of the wings and having a central opening, oppositely extending air-passage ways extending from the casing at diametrically opposite points and having longitudinal openings arranged adjacent the forward edges of the wings, said passage ways being a continuation of the cross sectional contour of the wings, a fan in the casing, a longitudinal passageway extending through the fuselage of the airplane, a passageway extending transversely across the tail of the airplane and having a rearwardly disposed discharge opening, and means for controlling the passage of air through any one of the passage ways.

In testimony whereof I affix my signature.

LEON H. JACOBS.